United States Patent [19]

Mishra

[11] Patent Number: 5,844,823
[45] Date of Patent: Dec. 1, 1998

[54] METHOD FOR SCALING-UP A TELECOMMUNICATION SYSTEM

[75] Inventor: Amitabh Mishra, Oak Brook, Ill.

[73] Assignee: Lucent Technologies Inc., Murray Hill, N.J.

[21] Appl. No.: 880,010

[22] Filed: Jun. 20, 1997

[51] Int. Cl.$^6$ .................................................... G06F 5/00
[52] U.S. Cl. ........................................ 364/578; 395/500
[58] Field of Search ........................... 364/578; 395/500; 455/446, 403

[56] References Cited

U.S. PATENT DOCUMENTS

| | | | |
|---|---|---|---|
| 5,245,638 | 9/1993 | Gustafson | 395/575 |
| 5,596,744 | 1/1997 | Dao et al. | 395/610 |
| 5,640,546 | 6/1997 | Gopinath et al. | 395/551 |

OTHER PUBLICATIONS

"An Expansive View of Reusable Software", Ellis Horowitz and John Munson authors, *IEEE Transactions on Software Engineering*, vol. SE–10, #5, Sep., 1994.

*Primary Examiner*—Vincent N. Trans
*Assistant Examiner*—Thai Phan
*Attorney, Agent, or Firm*—Jack R. Penrod

[57] ABSTRACT

A method for scaling-up an existing and successfully operating telecommunication system to an increased capability telecommunication system by using newer, higher performance components while keeping as much of the original software and hardware architecture as possible. To provide this scaling capability a detailed modeling method is disclosed which allows individual attention to each process of the original software to determine the impact of scaling on key performance parameters such as cycle time. With this method re-use levels of 80–90% of the existing software have been achieved when moving to increased capability telecommunication systems. This re-use means scaled-up systems will have lower development costs and lower risk of software error since a great majority of the software has already been tested and corrected. The model also allows big problems to be discovered and solved in the laboratory instead of at a field installation site where costs will be higher and development more complicated.

8 Claims, 2 Drawing Sheets

METHOD FOR SCALING-UP A TELECOMMUNICATION SYSTEM

TECHNICAL FIELD

The invention relates to system scaling and more particularly a method for scaling up telecommunication systems and the telecommunication systems produced thereby.

BACKGROUND OF THE ART

Larger electronic switching systems such as the 4ESS® and the 5ESS® by Lucent Technologies Incorporated, Murray Hill, N.J., have been in existence for over twenty-five years. These switching systems are controlled by electronic data processors running control programs, much like many other large contemporary systems.

These control programs, just like the hardware they control, are the end product of careful design and development projects. These completed projects also include considerable testing at the module, sub-system and system program levels. This testing greatly reduces the risk of a software induced failure. Thus, it is self evident that the control programs have considerable value of themselves. Because of this built in value, such system programs are often referred to as legacy system programs. Further, like the hardware which the control programs operate, this value is partly transferable if these control programs can be 'scaled-up', that is increased in operating speed and capabilities, as the hardware is 'scaled-up' to faster more capable processors and peripheral equipment. The possible transfer of high value at a low risk has led to a keen interest in software re-use in portions of the telecommunications industry.

Software re-use as a strategy potentially holds great promise in reducing the development cycle times for new software features and hardware platforms. But this promise can remain unfulfilled unless some of the implications of the re-use are well understood. It is clear that not all things scale in the same manner. For example, a building that has each linear dimension doubled will have its volume increased by a factor of eight. That means the heating and air conditioning capabilities, which are related to volume, must be increased by eight instead of just doubled. Control programs are similar to buildings in that scaling relationships are not always straight forward, especially when the hardware platform capabilities are increasing on the order of two to ten fold as much of the data processing hardware capabilities are increasing these days. Therefore, if a blind scale up of a set of control programs is attempted to control a platform that has increased two to ten fold or more, a lot of time can be expended re-engineering and re-designing the control programs to force the programs to achieve the performance to match the new hardware platform. This can occur even though the new hardware platform is 100% upward compatible with the previous platform, as they often are in telecommunications systems.

It is an object of the present invention to provide a method for evaluating a scaled up program to determine acceptability of the program's performance on the scaled-up hardware.

It is another object of the present invention to provide a method for evaluating changes to a hardware architecture for their effects on acceptability of a scaled-up program, It is another object of the present invention to provide a method for evaluating changes to a software architecture for their effects on acceptability of a scaled up program.

It is another objective of the present invention to provide a method for modeling a proposed hardware platform and a performance of a scaled up control program on that proposed hardware platform.

SUMMARY OF THE INVENTION

Briefly stated, in accordance with one aspect of the invention, the aforementioned objects are achieved by providing a method for scaling up an existing software program to operate on a scaled up telecommunication system. The method includes computing a scaling factor for scaling from a known telecommunication system to an increased capability telecommunication system; computing a lambda factor from an M/G/1 model of the increased capability system, computing a total segment count $N_i$ for the existing system, computing another total segment count $N_i$ for the scaled up increased capability telecommunication system; computing a cycle time, and comparing the computed cycle time result with an acceptance threshold and if the computed cycle time is at most equal to the acceptance threshold then ceasing the scaling method. If the cycle time is not acceptable, then continuing with changing the architecture of the scaled up increased capability telecommunication system and returning to the scale factor computing step to continue on from that part of the method.

In accordance with another aspect of the invention, the aforementioned objects are achieved by providing an increased capability system that is produced by the method for scaling up an existing software program to operate on a scaled up telecommunication system. The method includes computing a scaling factor for scaling from a known telecommunication system to an increased capability telecommunication system; computing a lambda factor from an M/G/1 model of the increased capability system, computing a total segment count $N_i$ for the existing system, computing another total segment count $N_i$ for the scaled up increased capability telecommunication system; computing a cycle time, and comparing the computed cycle time result with an acceptance threshold and if the computed cycle time is at most equal to the acceptance threshold then ceasing the scaling method. If the cycle time is not acceptable, then continuing with changing the architecture of the scaled up increased capability telecommunication system and returning to the scale factor computing step to continue on from that part of the method.

DETAILED DESCRIPTION

Figure 1:
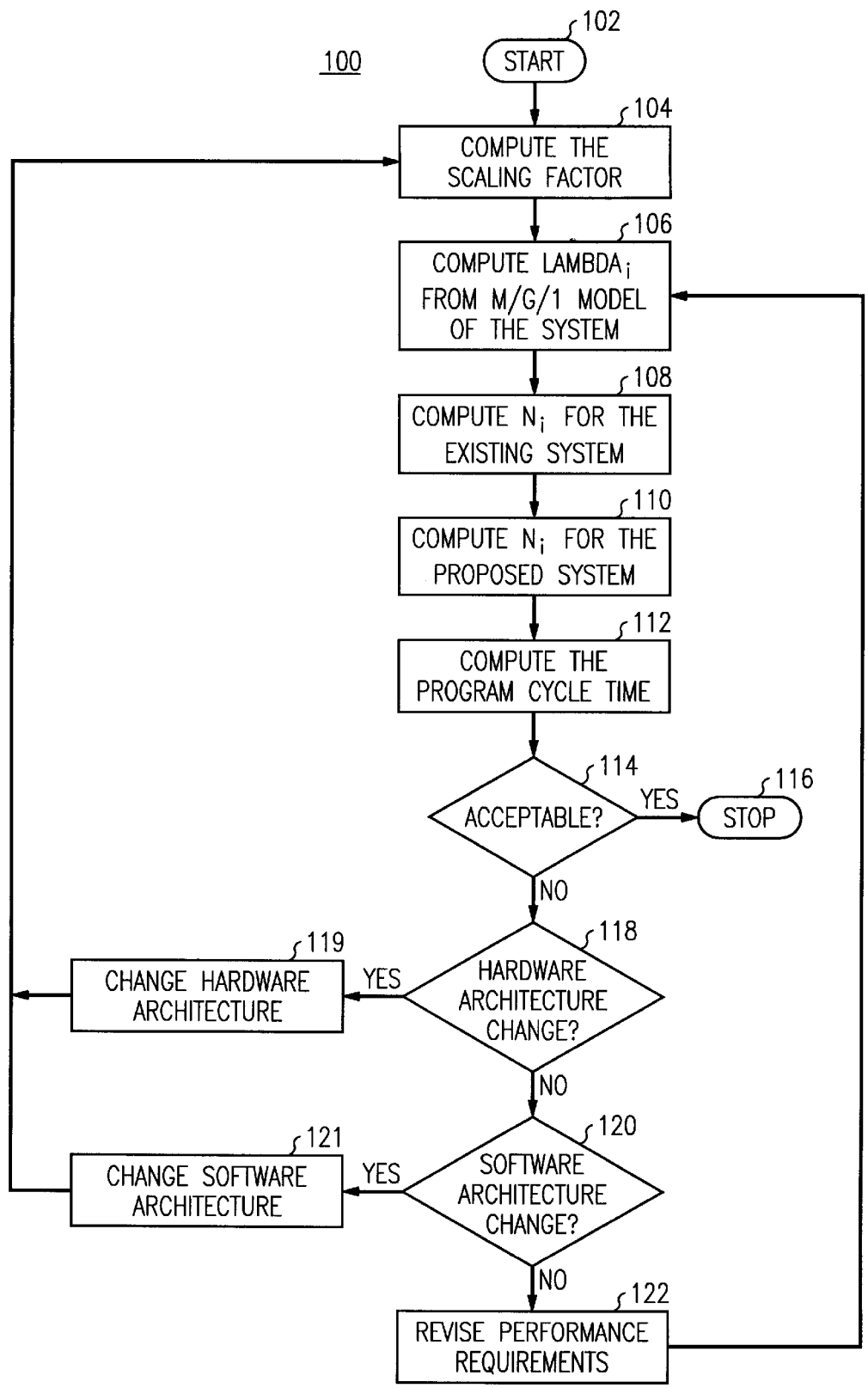
FIG. 1 is a logic flow diagram of a method for scaling a program.

Re-use, especially of legacy software, is not really an option with communications platform developers but rather a necessity in order to keep development costs down and stay competitive in the market place, and also in order to reduce development cycle times so that new features and products are timely introduced into the market. Moving to a new hardware platform is one of the means to reduce development cost, and software reuse can be one of the vehicles to reduce development cycle time.

Two compelling factors which are the motivations for moving on to a new hardware platform are the speed of processing as well as the cost of the hardware itself. The processing power of semiconductor devices has been constantly increasing over time while the cost per million operations per second of these devices is constantly going down. The increased processing power generally contributes not only to overall system efficiency, but its main benefit which is utilized by the switching product developers is in bringing the cost per user down by supporting significantly more telecommunication system components and lines per unit.

The size of some communication software is on the order of several million lines of code. Rewriting such a large piece of software even using the most recent object oriented paradigms is exorbitantly expensive as well as being risky because of the possibility of introducing programming errors. Software re-use comes as an appropriate mechanism to minimize both the risks and the development costs. This is true because it is much cheaper to modify, transform and enhance an existing software system than to create, debug and test a totally new one.

In communication, software reuse is present in various forms e.g. domain knowledge, development experience, design decisions, architectural structures, requirements, designs, code, documentation. While several aspects of software reuse are addressed in the literature, performance issues which arise due to re-use of communication software have not been discussed. Performance issues in the switching software can arise due to any of the aspects of the software re-use but the ones which can be critical from the performance perspective are due to the scaling aspect of the software re-use. Scaling affects several key performance metrics e.g. call capacity, operations-administration-and-maintenance (OA&M) execution times, overload control mechanisms, initialization times, audit and routine port conditioning cycle time. The effect of scaling on each key performance metric needs to be understood.

The present invention concerns the impact of scaling on the processors, the memories and other parts of the scaled-up system. Scaling helps to bring the cost per line down. This is often achieved by moving to a faster hardware and then putting more peripheral units to support many more users and yet keeping most of the software architecture unchanged. It is expected that all this will work, and there is substantial evidence to support that indeed it works when scaling changes are made in small increments. In essence, the cost per user is brought down by scaling of the hardware resources.

The present invention also concerns a method to quantify and evaluate impacts of scaling on the performance. Referring now to FIG. 1, a method 100 for evaluating the impact of scaling on various aspects of a control program is shown. Method 100 provides a step by step process to solve a characterizing equation. For the audit process, the characterizing equations have been found to be:

$$t_{iIII} = N_{iIII}/\lambda_{iIII} = k * N_{iII}/\lambda_{iIII}$$

where:

$t_i$ is the time for the cycle time of process i, such as the audit process $N_i$ is the total number of segments of process i (e.g. the audit process) in a cycle.

$\lambda_{iIII}$ is the average throughput achieved in segments per second for process i while system III is carrying its required average busy season busy hour (ABSBH) telephone traffic and k is a scaling factor between system II and system III. Method 100 can be run on a workstation such as those manufactured by SUN and Hewlett Packard. Method 100 could even be run on a personal computer such as an IBM PC or compatible with a 386 or higher capability processor, but it will not run as quickly as on a workstation.

Method 100 for scaling up an existing software process to operate on scaled up hardware starts at step 102, which is the starting place once the method 100 is implemented in a workstation or personal computer. Once started, method 100 continues from step 102 to step 104 where the scaling factor k is computed for the scaled up hardware. Re-arranging the equation above, it can be shown that:

$$k = N_{iIII}/N_{iII}$$

where $N_{iII}$ is a measured quantity of process segments of system II, which is known and measured and
where $N_{iIII}$ is a quantity of process segments of a proposed system III which is scaled up from system II.

After the scaling factor is computed, method 100 continues to step 106 where $\lambda_{iIII}$, the throughput factor is computed. As mentioned above, the throughput factor is the average throughput achieved in segments per second for process i while proposed system III is carrying its required average busy season busy hour (ABSBH) telephone traffic. This throughput factor is computed using a queuing model with a poisson arrival distribution, a generalized service distribution all for one server or system. In Kendall notation this would be M/G/1. After the throughput factor of the proposed system is computed, the method 100 continues to step 108.

In step 108, the total segments of process i for system II, $N_{iII}$, is computed from measured data, or since this may already have been computed, $N_{iII}$ may be simply looked up. Once $N_{iII}$ is obtained method 100 continues to step 110.

In step 110 the total segments of process i for system III, $N_{iIII}$, is computed for a proposed, scaled up system III. The best way to compute this quantity is to add up all of the segments of process i for the proposed, scaled-up system III. Alternatively, this computation may be an extrapolation from system II if variation in the hardware is allowed, but that would mean the scaling factor in step 104 is selected and not actually computed.

After all of these quantities are computed and/or looked up, the method 100 progresses to step 112 which calculates the cycle time for process i. This is an application of the equations:

$$t_{iIII} = N_{iIII}/\lambda_{iIII} = k * N_{iII}/\lambda_{iIII}$$

After computing the cycle time of process i of a proposed system III, method 100 continues to step 114 where this cycle time for process i is compared to a desired or required cycle time for that process. If the computed cycle time is less than or equal to the maximum cycle time for proposed system III then method 100 continues to step 116 which is to stop since cycle time of process i is within the maximum cycle time therefor.

If the cycle time exceeds the maximum cycle time, then method 100 continues to step 118 where performance trade-offs are made. At step 118, a determination is made whether to perform a change to the hardware architecture of proposed system III. If the answer is yes, then method 100 continues to step 119 where the effects of the hardware change are entered into the workstation or personal computer (not shown) for steps 104, 106, 108 and 110. Then after these steps are updated, method 100 returns to step 104 to find the cycle time for process i for the hardware revised system III.

If at step 118 the determination is to not change the hardware, method 100 continues to step 120 where a determination is made whether to change the software architecture of proposed system III. If the answer is yes, then method 100 continues to step 121 where the effects f the software change are entered into the workstation or personal computer (not shown) for steps 104, 106, 108 and 110. Then after steps 104–110 are updated, method 104 returns to step 104 to find the cycle time for process i for the software revised system III.

If at step 120 the determination is made to not change the software architecture, then method 100 progresses to step 122. At step 122, since performance does not meet the requirements and a hardware or software change did not cure the cycle time problem, the requirements for cycle time are changed so the system III can meet them. This is a recognition that the requirements put on the proposed system III may have been unduly optimistic and a less optimistic requirement may be acceptable given the modeling data. This change typically effects the processor throughput. Once the change to the requirements are made at step 122, method 100 returns to step 108 to re-determine the cycle time of proposed system III.

The steps 104–122 may be followed numerous times in order to perform trade-offs to arrive at a new system III that meets its requirements. When the requirements are met, then method 100 reaches its stopping point 116. Admittedly, steps 114, 118, 120 and 122 do contain human judgment either as programmed in thresholds or as stopping points for human input on how the architectures or the requirements might be changed. But such programmed-in or stop-for-entry techniques are common.

Figure 2:
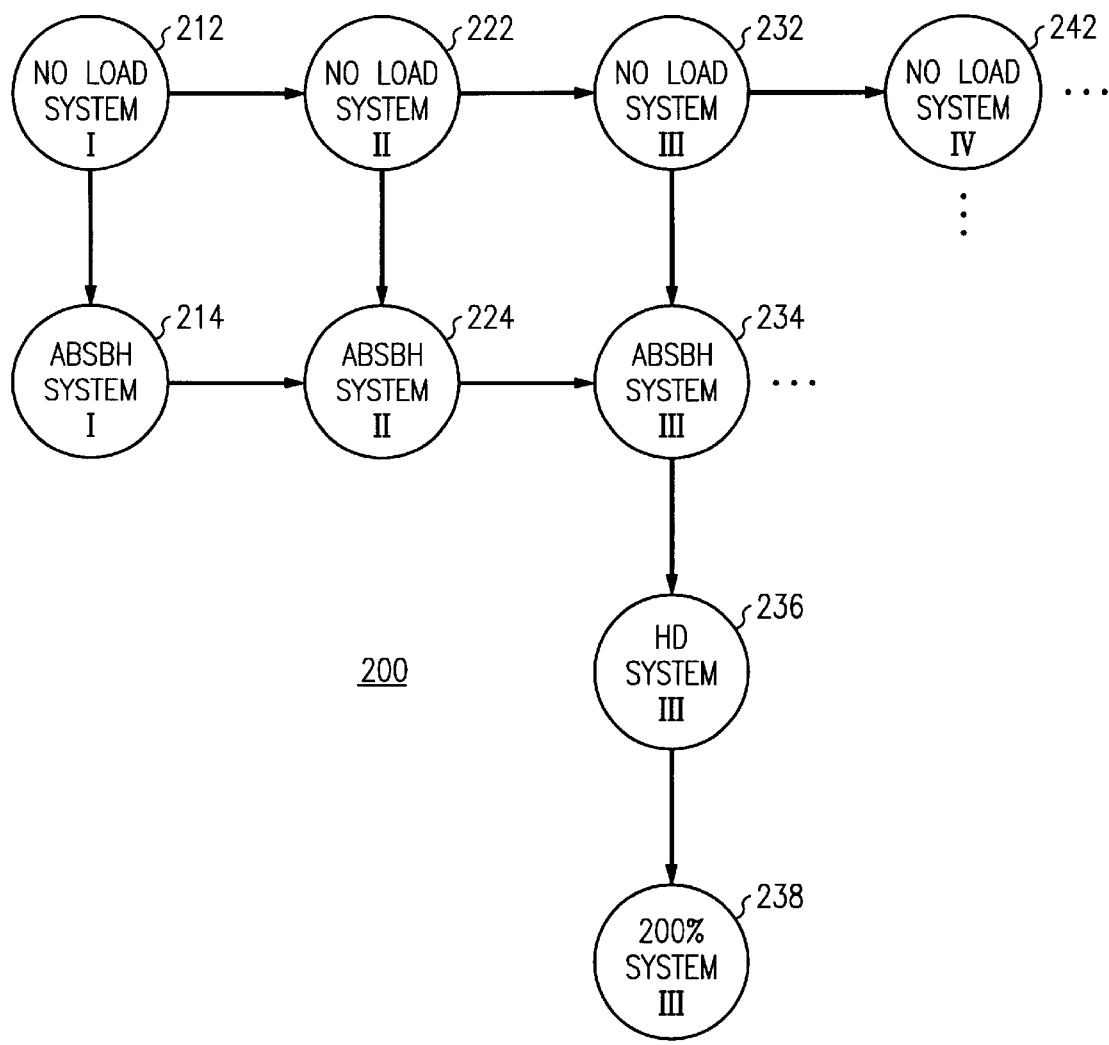
FIG. 2 is a flow diagram that illustrates a modeling process for scaling up systems.

Referring now to FIG. 2, the method 200 for modeling a proposed system III from existing systems I and II will be described.

Method 200 for modeling a proposed system III starts with data on system I, which is the hardware and software basis for the type of system that proposed system III is to be the scaled-up version of. The data of system I characterizes its no-load and its ABSBH operation. Since system I actually exists, the total number of segments of any process i can be counted and the throughput under no-load and ABSBH conditions measured. Establishment of this data performs steps 212 and 214 of method 200. Once system I is characterized, system II which is also an existing system is measured and data characterizing its no-load and ABSBH operation are collected and stored as steps 222 and 224 of method 200. Similarly, since system II actually exists, the total number of segments of any process i can be counted and the throughput under no-load and ABSBH conditions measured.

With these data characterizations of system I and system II, from the equations:

$$t_{iII}=N_{iII}/\lambda_{iII}=k*N_{iI}/\lambda_{iII}$$

the scaling factor k for modeling scaled-up system II can be verified. The scale factor is then considered to have the same characteristics when scaling-up from system II to proposed system III. Thus, a hardware and software model based on existing systems is used to obtain the scale factor that is used in method 100 to determine if cycle times for various processes are realistic.

This method 200, which can be run in a laboratory, is much more desirable than taking the hardware and software into the field and then trying to determine what the interaction and scaling of various processes will yield. Using changes between the no-load and ABSBH characteristics of system II and III, characteristics for heavy day operation and 200% overload operation of system III may also be modeled by method 200, as shown in FIG. 2.

Method 100 and supporting method 200 have been used by Lucent Technologies personnel to understand how the hardware and software architectures of the SM2000, the latest version of the service module of the 5ESS system as a scale-up of an earlier released version of the SM system. In processing power, the SM2000 can service many more lines of various kinds than the previous SM. But if too much of the SM2000 processor's time is utilized servicing lines and line ports, that leaves very little time for necessary but non-real time tasks like the audit process, which audits the status and health of the SM2000 unit. Early scale-ups of the SM software and hardware to the SM2000 platform resulted unexpectedly in very long, unacceptably long, audit cycle times. Analysis using modeling method 200 and evaluation method 100 found that the audit cycle grew as the hardware grew and therefore must be allotted a greater percentage of processor time to complete its cycle if audit cycles of about the same length of time as system I and system II are required. For the SM2000 the software architecture was changed and the requirements were changed because the proposed SM2000 hardware, a scale-up of an earlier SM system, could not meet its audit requirements.

Thus, it will now be understood that there has been disclosed a method for scaling-up a system. While the invention has been particularly illustrated and described with reference to preferred embodiments thereof, it will be understood by those skilled in the art that various changes in form, details, and applications may be made therein. For example, any process other than the audit process may be modeled in this manner. It is accordingly intended that the appended claims shall cover all such changes in form, details and applications which do not depart from the true spirit and scope of the invention.

What is claimed is:

1. A method for scaling up an existing software process to operate on a scale up of a known telecommunication system comprising the steps of:

a. computing a scaling factor for scaling from the known telecommunication system to an increased capability telecommunication system;

b. computing a lambda factor from an M/G/1 queuing model of the increased capability telecommunication system;

c. computing a total segment count $N_i$ for a process of the known telecommunication system;

d. computing a total segment count $N_i$ for a corresponding process of the increased capability system;

e. computing a process cycle time from the results of steps a–d;

f. comparing the computed process cycle time result with an acceptance threshold and if the computed process cycle time is at most equal to the acceptance threshold then stopping as the results of scaling operation are acceptable.

2. The method of claim 1, wherein said method for computing the scaling factor comprises the step of:

g. if the computed process cycle time is not acceptable, determining if changing the hardware architecture of the increased capability system is to be changed and if it is to be changed entering the changes and returning to step a.

3. The method of claim 2 wherein said method further comprises the step of:

h. if the computed process cycle time is not acceptable and the determination is that the hardware architecture of the increased capability system is not to be changed, determining if the software architecture of the process is to be changed and if the software architecture of the process is to be changed then entering the changes and returning to step a.

4. The method of claim 1 wherein said computing of the total segment count $N_i$ for the known telecommunication system comprises the step of counting a total number of segments in an existing process i of the known telecommunication system.

5. An increased capability telecommunication system produced from a method for scaling-up an existing software process to operate on a scale up of a known telecommunication system comprising the steps of:

a. computing a scaling factor for scaling from a known telecommunication system to an increased capability telecommunication system;

b. computing a lambda factor from an M/G/1 queuing model of the more capable telecommunication system;

c. computing $N_i$ for the known telecommunication system;

d. computing $N_i$ the increased capability telecommunication system;

e. computing a process cycle time from the results of steps a–d;

f. comparing the computed process cycle time result with an acceptance threshold and if the computed process cycle time is at most equal to the acceptance threshold then stopping as the results of scaling operation and hence the operation of the process for the increased capability telecommunication system acceptable, otherwise continuing to step g;

g. changing an architecture of the increased capability telecommunication system and returning to step a.

6. The system of claim 5, wherein step g further includes changing the software architecture of the increased capability telecommunication system.

7. The system of claim 5, wherein step g further includes changing the hardware architecture of the increased capability telecommunication system.

8. The system of claim 5, wherein step g further includes changing both the software architecture and the software architecture of the increased capability telecommunication system.

* * * * *